United States Patent [19]

Reich

[11] Patent Number: 5,254,853
[45] Date of Patent: Oct. 19, 1993

[54] OPTICAL SENSING DEVICE

[76] Inventor: Stefan Reich, Ulrichstrasse 68, D-8021 Icking, Fed. Rep. of Germany

[21] Appl. No.: 993,914

[22] Filed: Dec. 18, 1992

Related U.S. Application Data

[63] Continuation of Ser. No. 726,295, Jul. 5, 1991, abandoned.

[51] Int. Cl.$^5$ .............. G01V 9/04; G01N 21/86
[52] U.S. Cl. ................. 250/221; 250/222.1; 250/561
[58] Field of Search .......... 250/221, 222.1, 222.2, 250/561; 356/371, 376, 384, 385-387, 340, 341, 342, 343

[56] References Cited

U.S. PATENT DOCUMENTS

| | | | |
|---|---|---|---|
| 3,651,328 | 3/1972 | Hutto, Jr. et al. | 250/222.1 |
| 4,105,925 | 8/1978 | Rossol et al. | 356/376 |
| 4,532,723 | 8/1985 | Kellie et al. | 356/385 |
| 4,767,922 | 8/1988 | Stauffer | 250/221 |
| 4,874,242 | 10/1989 | Bezard et al. | 356/343 |
| 4,934,810 | 6/1990 | Nägele et al. | 356/376 |

FOREIGN PATENT DOCUMENTS 3427623 1/1986 Fed. Rep. of Germany .

OTHER PUBLICATIONS

Description of SUNX Collision Prevention Sensor PX1 Series SUNX.
Leaflet-Sick Opto-Electronic.
Entwicklung Eines Fotoschalters Mit Enfernungmessung, SDS-Relais.

Primary Examiner—Davis L. Willis
Assistant Examiner—Hoa Q. Pham
Attorney, Agent, or Firm—Helfgott & Karas

[57] ABSTRACT

An optical sensing device for detecting the presence of an object within a sensing volume such as a door-frame has at least one light source consisting of a light emitting diode and a light sensor. A cylindrical rod made of a transparent material and having a circular cross-section is associated with the light emitting diode and the light sensor to form the light emitted by the light emitting diode into an essentially sheet-like beam of light and to establish an essentially sheet-like field of view of the light sensor. The beam or beams of light and the field of view intersect to define the sensing volume at a predetermined distance from a surface positioned opposite of the sensing device.

12 Claims, 4 Drawing Sheets

OPTICAL SENSING DEVICE

This is a continuation of application Ser. No. 726,295, filed Jul. 5, 1991, now abandoned.

FIELD OF THE INVENTION

The present invention relates to optical sensing devices and more specifically to optical sensing devices for detecting the presence and/or distance of an object from a device within a predetermined sensing range or volume.

DESCRIPTION OF THE RELATED ART

A known optical sensing device comprises a light source consisting of a light emitting semiconductor diode (LED) and an optical system for producing a focused beam of light, and a light sensor consisting of a semiconductor photodiode (PS) and an optical system which limits the field of view to a narrow "receiving" beam. The beam of light and the receiving beam intersect in a sensing volume. Only objects which enter the sensing volume are detected while variations of the conditions beyond the sensing volume including variations of the reflectivity of the background are without effect.

A known optical sensing device for detecting the distance of an object comprises a light emitter for producing a narrow beam of light and a light receiver consisting of a position sensitive semiconductor diode array and an optical system. A reflecting object which enters the beam of light is imaged on the position sensitive semiconductor array. The distance of the object from the sensing device can be calculated from the position of the image on the diode array.

A known collision prevention sensor has a club-shaped sensing area which is relatively wide in a horizontal plane and relatively narrow in a vertical plane.

SUMMARY OF THE INVENTION

It is an object of the invention to provide an optical sensing device which has a sensing volume which is relatively wide in a first dimension yet allows to limit the sensing volume at a defined sensing distance and which is simple, inexpensive and reliable in operation.

A further object of the invention is to provide an optical sensing device for detecting the presence and/or distance of an object in a sensing volume or range which is insensitive to spurious effects, such as variations of the reflectivity of the background.

According to a first aspect of the present invention, an optical sensing device comprises light source means and light detecting means, said light source means including a light source, such as a LED, and an optical system which forms light emitted by the light source into an essentially sheet-shaped beam, said light detecting means including a light sensor, such as a semiconductor photodiode (PD), and an optical system which limits the field of view of the light detector to an essentially sheet-shaped sensing volume. According to the invention, the sheet-shaped beams cross each other with an acute angle to create a defined limitation of the sensing distance. In a preferred embodiment of the invention, each of said optical systems comprises a cylindrical rod made of a light transparent material, such as glass or plastics, e.g. polymethylmetacrylate. A diaphragm or light shield having a straight edge is positioned between each of said optical systems and the light source or light sensitive device, respectively. The straight edge is parallel to the axis of the cylindrical rod and limits the beam of light or viewing volume, respectively. According to a further preferred feature of the invention, a second cylindrical rod made of a transparent material is arranged between the light sensing means and the first mentioned cylindrical rod, said second cylindrical rod having a smaller diameter than said first cylindrical rod and limiting the longer dimension of said viewing volume.

According to a second aspect of the invention which may combined with said first aspect of the invention, an optical sensing device comprises light source means which includes at least one pair of light sources, such as twin LED's or a pair of individual LED's, and an optical system for generating at least one pair of light beams which are oriented and displaced with respect to each other such that the beams overlap each other at least within a sensing volume. The optical sensing device further comprises light detector means including a light sensitive element, such as a semiconductor photodiode or a phototransistor, and an optical system which establishes a beam-like viewing volume or field of view of said light sensitive element, said field of view including at least a portion of said sensing volume defined by the intersection of said pair of light beams. The optical sensing device according to the second aspect of the invention comprises means for alternatingly activating the light sources of the pair.

The light beams may be relatively wide compared with the field of view which should be relatively narrow and well defined to increase the detection sensitivity and to reduce spurious responses. The relative intensities of the light sources may be different or variable to allow electronic adjustment of the detection range. The device according to the second aspect of the invention is useful both for detecting the presence and the distance of an object within the detection range. The detection range may be adjustable.

DESCRIPTION OF THE PREFERRED EMBODIMENTS

Figure 1:
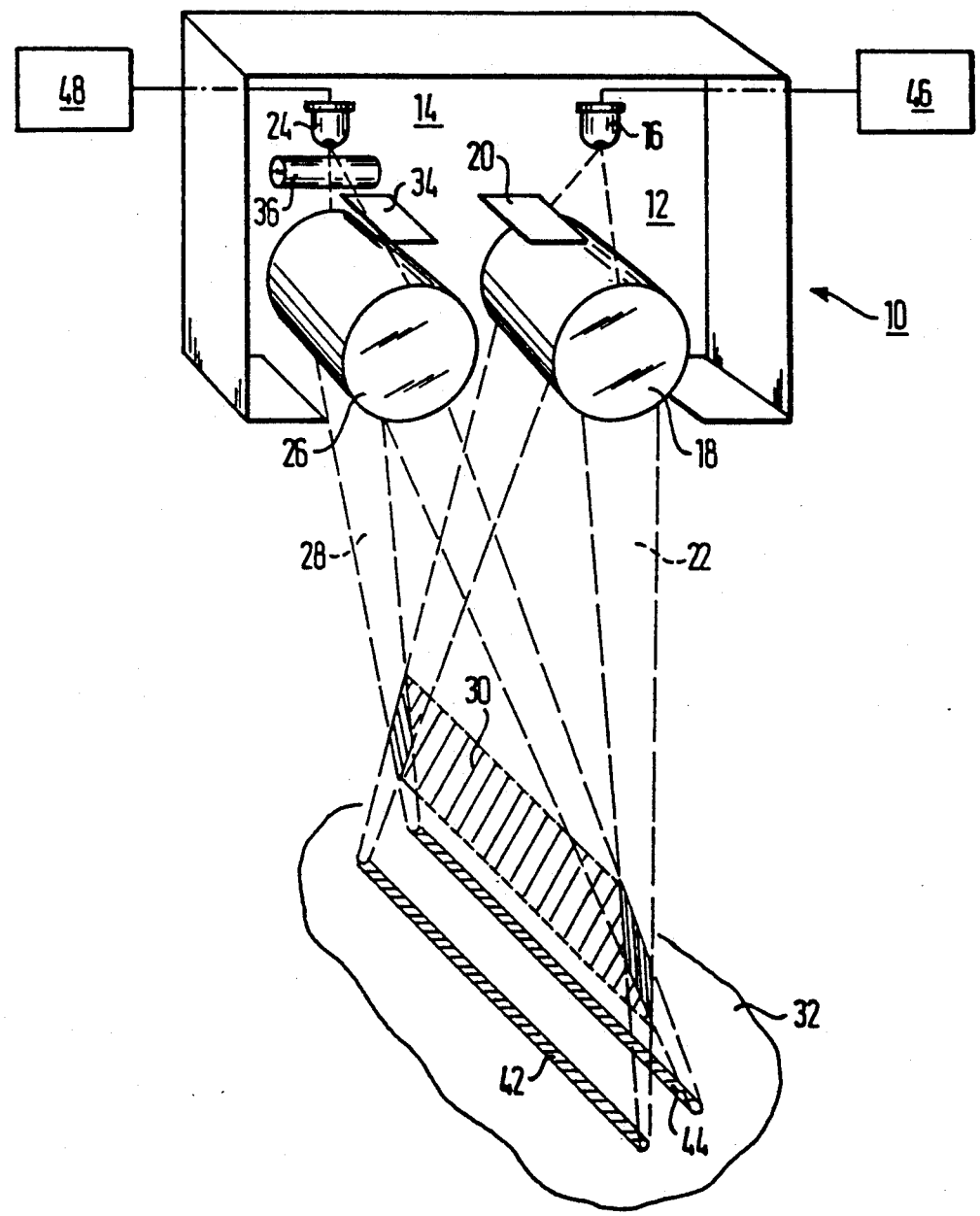
FIG. 1 is a simplified view of a first embodiment of an optical sensing device according to the invention.

FIG. 1 shows schematically an optical sensing device 10 according to the first aspect of the invention. Device 10 comprises a light source portion 12 and a light detecting portion 14.

Light source portion 12 includes a light source in form of a light emitting semiconductor diode 16, and an optical system which is comprised of a straight cylindrical rod 18 made of a material transparent to the light of the light source 16, and having a circular cross section. A suitable material for the rod 18 is glass, however, other materials may be used, e.g. transparent plastics, as polymethylmetacrylate, quartz and the like, depending on the wavelength of the light emitted by the light source 16. The transparent cylindrical rod 18 acts as cylindrical lens means and forms the light emitted by the LED into an essentially sheet-shaped beam 22. It should be noted that the term "light" as used herein is intended to include visible light as well as infrared and ultraviolet light.

The optical system further comprises an opaque diaphragm plate 20, which is positioned between the light source 16 and the rod 18. The plate 20 has a straight edge which is parallel to the longitudinal axis of rod 18 and serves to limit the essentially sheet-like beam of light 22 at its side which faces the light detecting portion 14.

The light detecting portion 14 includes a light sensor 24 which consists of a light sensitive semiconductor diode or other light sensitive devices such as a phototransistor, further cylindrical optical means in form of a second rod 26 which is similar to and parallel to rod 18 to establish a predetermined field of view 28 of the photodiode 24. The field of view 26 has a similar shape as the light beam 22, and the photodiode 24 is positioned with respect to the rod 26 so that the beam of light 22 and the field of view 28 intersect in a detecting or sensing volume 30 which is spaced from a background surface 32. A diaphragm plate 34 is provided between the photodiode 24 and the rod 26 to limit the field of view 28 at its side facing the light source portion 12.

A third straight rod 36 is positioned between the photodiode 24 and the plate 34. The rod 36 has a circular cross section, the diameter of which is smaller than that of the rods 18 and 26, and is made of a transparent material of the above mentioned type. The axis of the third rod 36 is normal to the axis of the second rod 26, and the rod 36 limits the field of view 28 in its larger dimension, i.e. the dimension parallel to the axis of the second rod 26.

The LED 16 which emits incoherent light is energized by a suitable dc or ac or pulse power source 46. The PD 24 is coupled to a sensor circuit 48 which may comprise a Schmitt-trigger circuit. Units 46 and 48 are well known in the art, thus no further explanation is necessary.

The optical system for shaping the beam of light 22 and the field of view 28 is very simple and inexpensive while providing a well defined beam of light and a well defined field of view, respectively.

Figure 2:
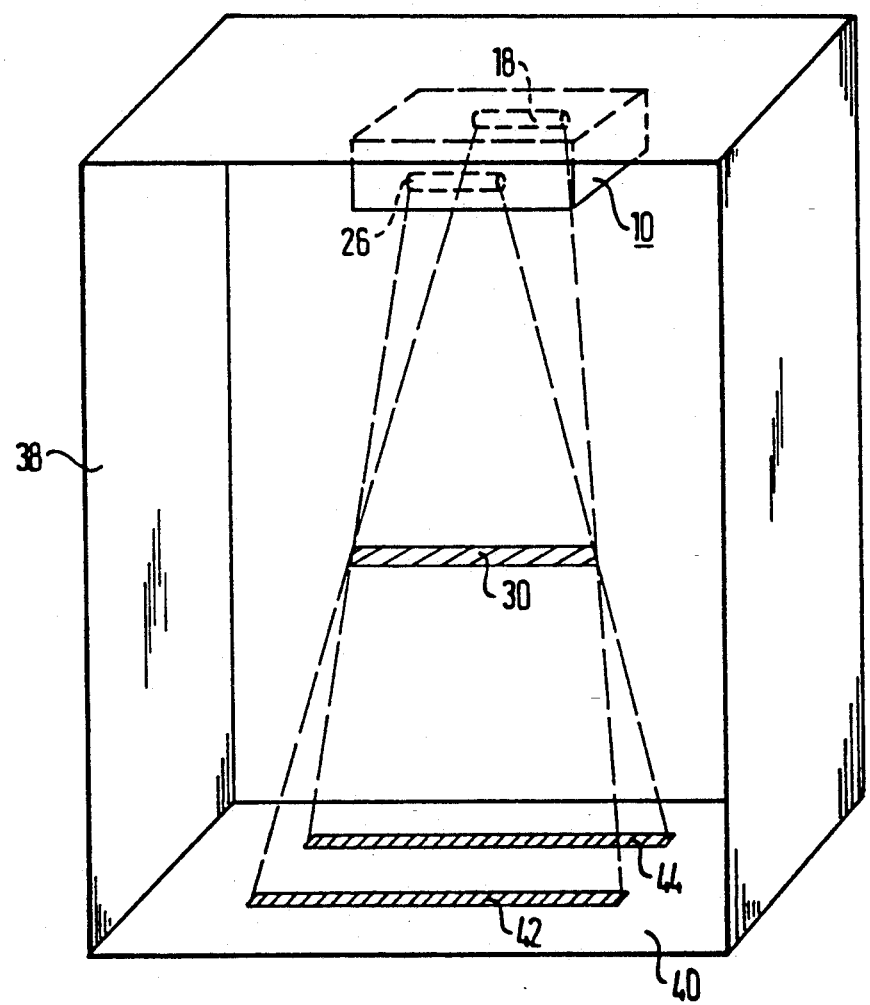
FIG. 2 is a simplified view of the optical sensing device of FIG. 1 mounted for monitoring a door of a vehicle.

FIG. 2 shows the optical sensing device 10 mounted on an upper transverse portion of a door-frame 38 to be monitored. The sensing volume 30 is spaced about 30 cm above the threshold 40 of the door so that the light beam 22 and the field of view 28 intersect the surface of the threshold 40 at well separated regions 42 and 44, respectively. The output of the optical sensing device 10 is used to prevent closing the door wings (not shown) when an object is detected in the sensing volume 30, as well known in the art.

Figure 3:
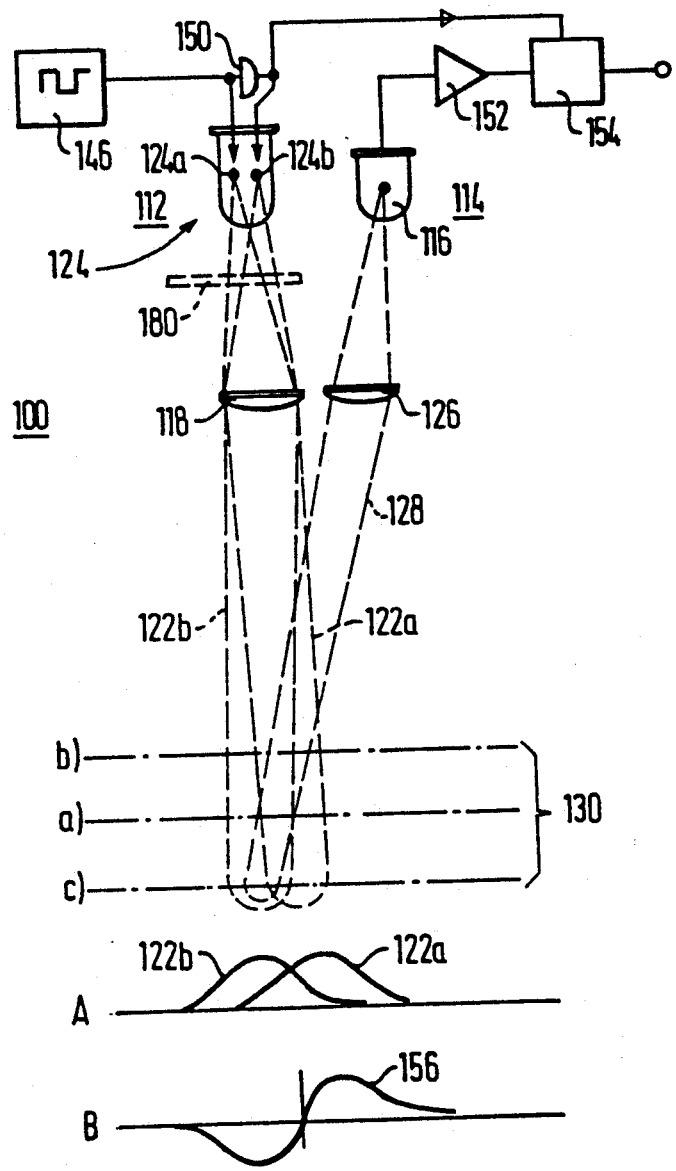
FIG. 3 is a schematic view of another embodiment of an optical sensing device according to the invention, and also showing waveforms useful for explaining preferred modes of operation of the device.

Referring now to FIG. 3, an optical sensing device 100 according to a second embodiment of the invention comprises a light source portion 112, and a light detector portion 114. The light source portion 112 of the embodiment shown in FIG. 3 includes a twin light emitting diode 124 of the type Siemens CQW15 which comprises a pair of incoherent infrared light emitting crystals 124a, 124b. The light detector portion comprises a single semiconductor photodiode 116.

An optical system which may comprise a spherical lens 118 is positioned in front of the twin LED 124 at a distance essentially equal to the focal length of the lens so that the light emitted by the crystals 124a, 124b is collimated into beams 122a and 122b, respectively. The beams 122a, 122b form an acute angle and overlap each other partially within a detection range 130 as shown.

The light detecting portion 114 comprises a photodiode 116 (or a phototransistor) and an optical system, such as a lens 126. The distance between the light sensitive crystal of the photodiode 116 and the lens 126 is essentially equal to the focal length of the lens to establish a narrow "collimated" field of view 128 which intersects the region where the light beams 122a, 122b overlap within the sensing range 130. A central axis of the field of view forms different acute angles with the central axes of the beams of light.

The field of view 128 is relatively narrow and well defined in comparison with the beams of light 122a, 122b. The lenses 118, 126 may be spherical lenses. Alternatively, cylindrical lens systems as described with reference to FIG. 1 may be used.

The light emitting crystals 124a, 124b are energized alternatingly by a power source 146 directly and through an inverter 150, respectively. The photodiode 116 is coupled to the input of an amplifier 152, the output of which is coupled to a detector circuit 154 which also receives a signal from the output of the inverter 150. The detector circuit 154 may comprise means for forming a signal representing the difference of reflected light components stemming from the first and second light emitting crystals, respectively. The power source and detector circuitry will be explained in more detail with reference to FIG. 5.

In the embodiment described, the infrared (IR) emitting crystals 124a, 124b are energized alternatingly with a frequency of about 5 kHz. The waveform of the light reflected by an object within the detection range 130 and sensed by the photodiode 116 will depend on the position of the object within the detecting range. An object at the distance indicated by line a) within the region of overlap of the light beams 122a, 122b will receive equal amounts of light from both light sources 124a, 124b, thus, the ac component of the signal produced by the photodiode 116 will exhibit a minimum. Thus, the illumination is symmetrical as shown in diagram A of FIG. 3.

In position b), the signal produced by beam 122a will predominate while in position c) the signal generated by beam 122b will predominate. The output signal of the photodiode 116 is amplified by amplifier 152 and subjected to phase detection by means of a synchronous detector within the detector circuit 154, the synchronous detector being controlled by the output signal from the inverter 150.

When the component of the output signal of photodiode 116 which stems from beam 122b is subtracted from the component stemming from beam 122a, waveform 156 shown in diagram B results. The negative minimum of waveform 156 corresponds to the position c) in the detection range 130, the zero crossing corresponds to the position a) and the positive maximum corresponds to the position b).

In another mode of operation of the device of FIG. 3, the twin LED is operated so that the light emitting crystals 3, 4 emit light of different intensities. Thus, the intensity of beam 122a may be smaller than that of beam 122b as shown in diagram C. Thus, an output characteristic 158 as shown in diagram D results. This mode of operation has the advantage that a background having a greatly varying reflectivity does not impair the operation of the device.

Figure 4:
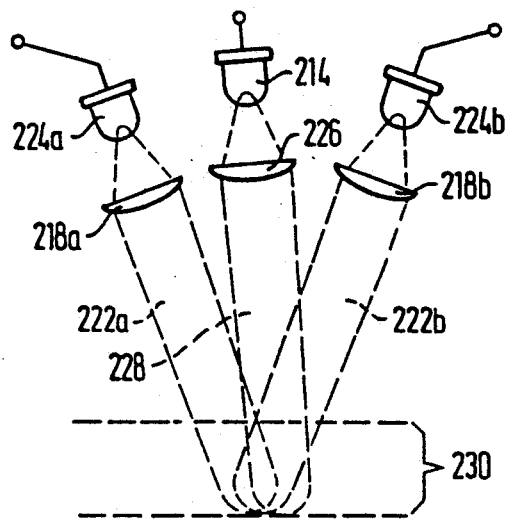
FIG. 4 a schematic view of the essential portions as modified of the embodiment of an optical sensing device of FIG. 3.

The essential portions of a modified structure of the second embodiment of the invention is shown in FIG. 4. Here, the light source portion comprises two individual light emitting diodes 224a, 224b positioned in line on opposite sides of a photodiode 214. Lens means 218a and 218b, respectively, collimate the light emitted by the LED's 224a, 224b into collimated beams 222a, 222b.

The beams 222a, 222b overlap each other partially within a detection region 230. Lens means 226 is associated to photodiode 214 to establish a narrow, beam-like field of view 228. The field of view 228 intersects obliquely the region where the light beams 222a, 222b overlap. More specifically, a central axis of the field of view forms different acute angles with the central axes of the beams of light. The operation of the device of FIG. 4 is similar to that of FIG. 3.

Figure 5:
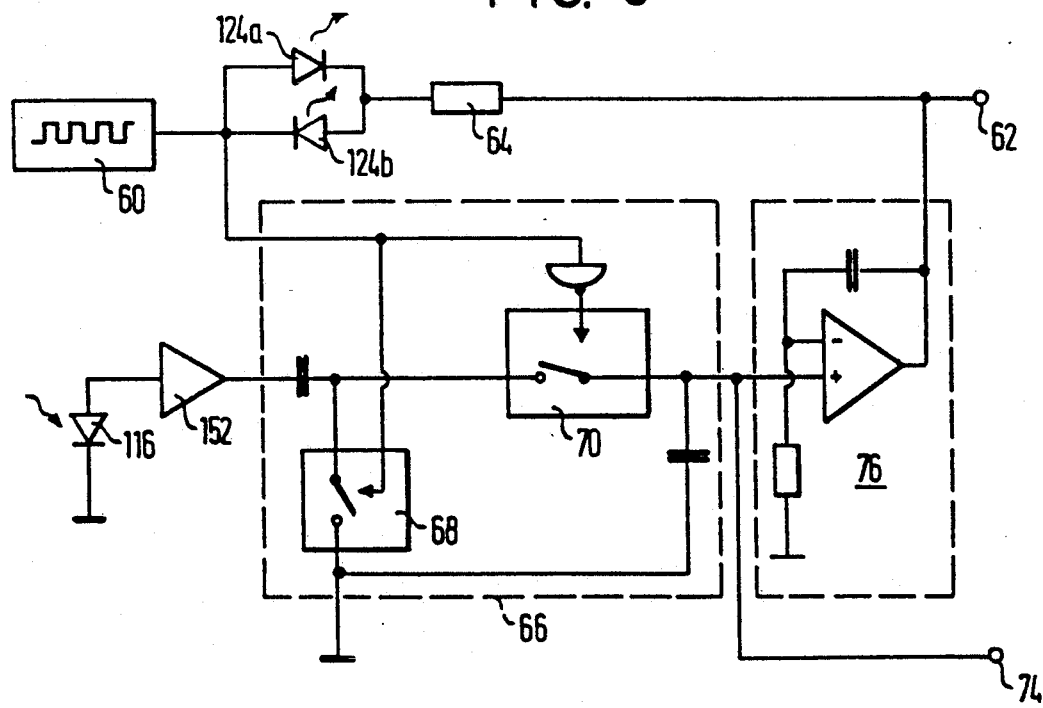
FIG. 5 is a schematic circuit diagram of an electronic circuit for operating the devices shown in FIG. 3 and 4.

FIG. 5 shows an electronic circuitry useful for the devices explained with reference to FIGS. 3 and 4. The circuit of FIG. 5 will be explained with reference to FIG. 3, it is, however, likewise applicable to the device of FIG. 4.

The circuit of FIG. 5 comprises an oscillator 60 for generating a rectangular wave. A frequency of 5 kHz is suitable. The output of the oscillator 60 is coupled to one terminal of the LED's 124a, 124b which are connected in parallel with opposite polarities so that they will emit light alternatingly. The other terminals of the diodes 124a, 124b are coupled to a first output terminal 62 via a resistor 64. Thus, the positive halfwaves of the output signal of the oscillator 60 will cause the LED 124a to emit light while the negative half waves will cause the LED 124b to emit light. The output signal of the oscillator 60 is further applied to a control signal input of a synchronous demodulator or rectifier 66, which comprises a pair of electronic switches 68, 70 shown schematically. The switches may be an integrated circuit of the type CD4016 and are closed alternatingly by the oscillator signal. A signal input of the circuit 66 receives the output signal from the photodiode 116 via amplifier 152. The output signal of the synchronous rectifier or demodulator circuit 66 is applied to a second output terminal 74 and to the input terminal of an integrating circuit 76.

The photodiode 116 will produce an output signal when an object enters the detection range 130. If the output signal comprises an ac component, a positive or negative voltage appears on output terminal 74 as explained with reference to diagram B in FIG. 3. The integrating circuit 76 operates as regulating amplifier which varies the voltage applied to resistor 64, and, thus, the ratio of the currents flowing in the LED's 124a, 124b until any unsymmetrical optical coupling to the photodiode is compensated and the gated rectifier circuit 66 again produces a zero output signal. Thus, at output terminal 62, an output voltage is available which has a magnitude which is independent of the reflectivity of the detected object and depends only on the ratio of the light intensities stemming from beams 122a and 122b. Thus, the output voltage at the first output terminal 62 is proportional to the distance of the object within the detection range 130.

Various modifications and variations of the above-described embodiments will be obvious to those skilled in the art. Twin LED's or two paired LED's can be employed instead of each of the single LED's 224a, 224b of FIG. 4, so that four light sources are provided which are arranged in line. The two "inner" photodiodes are energized in alternation with the two "outer" photodiodes. A single light sensitive device, as a semiconductor photodiode with associated lens means is positioned symmetrically to the LED's. The light beams of the LED's and the field of view of the PD overlap within a detection range. Since light is projected symmetrically into the detection range, the measurement is more insensitive against specular reflecting surfaces and contrast variations.

A groundglass plate 180 (FIG. 3) may be positioned in the light beam paths to smoothen the transition between the beams 122a, 122b.

A twin photodiode or a twin phototransistor may be used as light sensitive device. In this case, two overlapping fields of view are established, one of which sensing the right portion or edge of the sensing area and the other sensing the left portion or edge of the sensing area. The two output signals produced by such an arrangement may be subtracted to make the device more insensitive to spurious effects.

Cylindrical lenses with a half-circular cross-section, or cylindrical mirrors may be used instead of the described rods with circular cross-section to serve as cylindrical optical elements. Generally, any type of cylindrical optics having two axes with two different focal lengths may be used.

The crossing beam of light and field of view may have essentially the form of flat elongated triangles having acute apices at the light source and light detector, respectively, and their margins may be relatively fuzzy in the region where they cross each other, and relatively sharp beyond that region. This will extend the detection sensitivity of the device to a nearer range and make the device quite insensitive against background effects.

The field of light may be symmetrically disposed relative to a pair of crossing light beams, e.g. in a device of the type described with reference to FIG. 4.

I claim:
1. An optical sensing device for sensing the presence of an object in a space between the sensing device and a predetermined opposed surface, said surface being positioned in a fixed space relationship with respect to said sensing device to define said space, said device comprising:
   light source means including at least one source of light and an optical system for shaping the light emitted by said source of light into a beam of light directed to said surface and having a first dimension which is large in comparison with a second dimension normal to that first dimension;
   light detector means including a light sensor and an optical system which establishes a field of view of said light sensor, said field of view being directed to said surface and having a first dimension which is large in comparison with a second dimension normal to said first dimension; said first dimension of said beam of light being essentially parallel to said first dimension of said field of view;
   wherein said beam of light and said field of view are arranged so that they intersect each other so as to form a sensing volume which is spaced from said surface to provide a limiting sensing distance;
   said optical systems of said light source means and said light detector means comprising first and sec- ond cylindrical optical elements, respectively, said optical elements being made of a transparent material and having each a fully circular cross-section and an axis; said axes being essentially parallel to each other and to said first dimensions, said optical systems of said light detector means further comprising a third cylindrical optical element, said third cylindrical optical element having an axis and a circular cross-section, said third optical element being positioned between said light sensor and said second cylindrical optical element, said axis of said third optical element being normal to the axis of said second optical element, and said second optical element having a diameter which is larger than a diameter of said third optical element.

2. The optical sensing device as claimed in claim 1, wherein said third cylindrical optical element is made of a transparent material and having a focal strength which is smaller than that of said second optical element.

3. The optical sensing device as claimed in claim 1, wherein a light shield having a straight edge is positioned between said source of light and said first cylindrical optical element.

4. The optical sensing device as claimed in claim 1, wherein a light shield having a straight edge is positioned between said light sensor and said second cylindrical optical element.

5. The optical sensing device as claimed in claim 1, wherein each of said light sources is comprised of a light emitting diode, and said light detector is comprised of a light sensitive semi-conductor device.

6. An optical sensing device for sensing the presence of an object in a space between the sensing device and a predetermined opposed surface, said device comprising:

light source means including at least one pair of first and second light sources;

a first optical system associated with said light sources to shape the light emitted by each of said light sources into first and second sheet-like beams of light, respectively, said light sources and said optical system being constructed and arranged in respect to each other so that the beams of light are directed towards said surface and overlap each other so as to form in a region of overlap thereof a sensing volume which is spaced from said predetermined opposed surface;

means for alternatingly energizing said first and second light sources;

light detector means including a light sensor and a second optical system which establishes a beam-like field of view of said light sensor, said field of view obliquely intersecting said sensing volume; and means coupled to said light sensor and responsive to light of each of said light sources reflected from an object within said sensing volume towards said light sensor.

7. The optical sensing device as claimed in claim 6, wherein said beams of light form different acute angles with a central axis of said field of view.

8. The optical sensing device as claimed in claim 6, wherein said first and second beams of light have different intensities.

9. The optical sensing device as claimed in claim 8, wherein the relationship between the intensities of said first and second beams of light is variable.

10. The optical sensing device as claimed in claim 6, wherein said means for alternatingly energizing said first and second sources of light have a predetermined frequency and said detector means are coupled to an output of said light sensor and are controlled in synchronism with said frequency.

11. The optical sensing device as claimed in claim 6, wherein said first optical system associated to said light source means and the optical system associated to said light detector means each includes a cylindrical optical element made of a transparent material and having an axis, said axes of said optical elements being parallel to each other.

12. The optical sensing device as claimed in claim 6, wherein each of said light sources is comprised of a light emitting diode, and said light detector is comprised of a light sensitive semi-conductor device.

* * * * *